Sept. 21, 1965  E. SCHASCHL ETAL  3,207,983
RESISTANCE CHANGE CORROSION PROBE
Filed May 1, 1961  2 Sheets-Sheet 1

INVENTORS
EDWARD SCHASCHL
BY GLENN A. MARSH

Edward H. Lang
ATTORNEY

3,207,983
RESISTANCE CHANGE CORROSION PROBE
Edward Schaschl and Glenn A. Marsh, Crystal Lake, Ill., assignors to The Pure Oil Company, Chicago, Ill., a corporation of Ohio
Filed May 1, 1961, Ser. No. 106,679
10 Claims. (Cl. 324—71)

This invention relates to an apparatus for the measurement of corrosion by resistance-change techniques. More particularly, this invention relates to a corrosion probe adapted to produce a linear corrosion-resistance response over an extended period of useful probe life.

Various corrosion-test probes, test coupons, and other devices have been used in the past for determining surface corrosion rates. Corrosion-test probes and measurement devices of the resistance-change type, as described in U.S. Patents Nos. 2,834,858, granted May 13, 1958, and 2,851,570, granted September 9, 1958 to Edward Schaschl, and U.S. Patent No. 2,824,283, granted February 18, 1958, to Lynn Ellison, have been found to be especially useful in measuring surface corrosion rates. Such probes employ one exposed test specimen and a compensating specimen protected by corrosion-impervious material to provide automatic temperature-resistance compensation. The resistance ratio of the two specimens changes as the exposed specimen corrodes and the cross-sectional area of this specimen is decreased. The extent of corrosion is measured by means of a resistance-ratio-change-measuring circuit, such as a Wheatstone bridge circuit.

Other corrosion probes, such as disclosed by Dravnieks, U.S. Patent No. 2,735,754, employ two bare specimens which are exposed to the corrosive environment. One of the specimens, instead of being coated wtih a corrosion-impervious material, is made much thicker than the test specimen, so that the corrosion rate of the thicker specimen, expressed as percent of thickness, differs substantially from that of the test specimen, and the rate of percentage resistance change of the specimens differs even though they corrode at the same absolute rate. It is evident that such probes lend themselves to corrosion measurement by resistance-change techniques, although the correlation between resistance-ratio change and depth of metal removed by corrosion is different from that of the probes in which the compensating specimen is coated with a corrosion-impervious material. While such prior art probes have proved to be highly useful in corrosion studies, the probes suffer from a disadvantage in that the relationship between the extent of metal removed by the corrosion process and the magnitude of resistance-ratio change is not constant throughout the corrosion of the probe, but changes as the corrosion process progresses. Accordingly, the removal of the first micro-inch of metal from the test specimen of the probe results in a different resistance-ratio change than does the removal of the twenty-fifth micro-inch of metal from the test specimen, for example.

As a practical matter, it was found that the prior art corrosion probes maintained a substantially linear relationship between the extent of metal removed by corrosion and the extent of resistance-ratio change over only about the first 5% of probe life, i.e., until about 5% of the metal comprising the test specimen was removed by the corrosion process. Accordingly, it is necessary either to replace the probes after a very short period of exposure to the corrosive environment, or to fabricate a resistance-ratio-change meter having a built-in non-linearity equal to that of the corrosion probe, to counteract the non-linearity of the corrosion probe over a greater portion of probe life, so that the meter will indicate corrosion-extent readings representative of the actual corrosion extent. While the design of such compensating-meter systems is possible, the meter is necessarily more expensive and difficult of construction than the simple bridge circuit, and is useful only with the corrosion probe to which it has been mated.

It is an object of this invention to provide a novel resistance-ratio corrosion probe having a linear corrosion-resistance-ratio response over an extended useful probe life.

This invention is based upon the discovery that by providing a corrosion-test probe with bare test and compensating specimens fabricated to critical dimensions, a probe is produced which is substantially linear in corrosion-resistance-ratio response until the dimensions of the test specimen have been reduced by 40% of the initial thickness. The invention is best described with reference to the drawings, of which:

Figure 1:
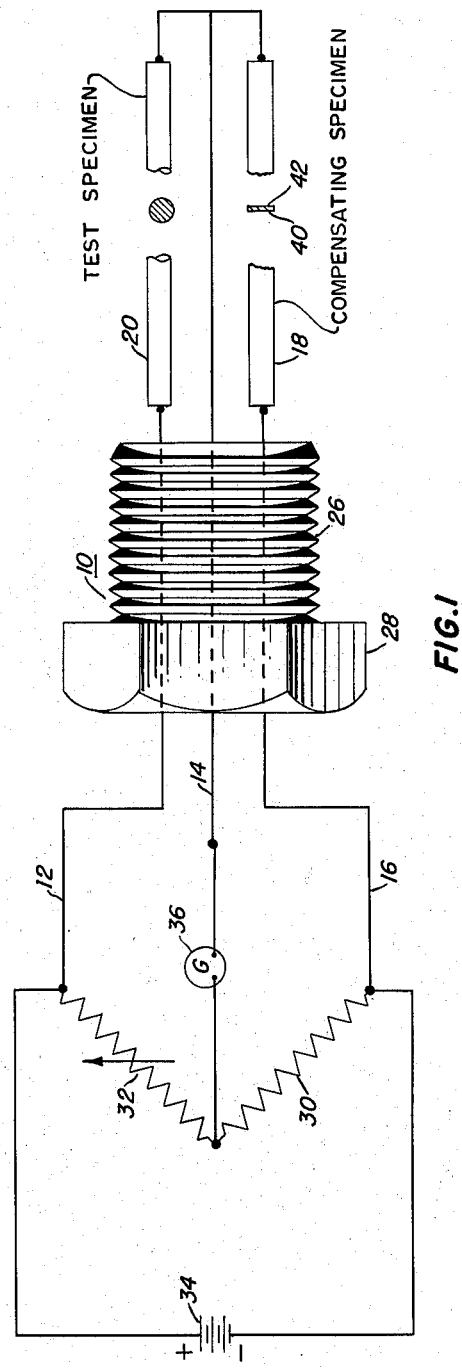
FIGURE 1 is an elevational view of the novel test probe of this invention, and includes a schematic diagram of a simple measuring circuit which may be used in conjunction with the novel probe.

Referring to FIGURE 1, base member 10 is made to accommodate wires 12, 14, and 16, which pass through base 10 in electrically insulated relationship therewith. Compensating specimen 18 is a bare, ribbon-like, uncoated strip of metal of rectangular cross-section. Test specimen 20 is fabricated of the same metal as is compensating specimen 18, and accordingly undergoes the same actual corrosion rate, in micro-inches of metal removed, as the compensating specimen 18. Test specimen 20 is of circular cross-section. A Wheatstone bridge measuring circuit is shown connected to the connectors 12, 14, and 16. Fixed resistance 30, and variable resistance 32, are connected in two arms of the Wheatstone bridge circuit. Thus the bridge circuit is composed of four arms, represented by the resistances 30 and 32, and by the specimens 18 and 20. The variable resistance must be in the arm adjacent to the circular specimen 20, as shown. The resistances and specimens are serially connected in closed circuit to provide four junctures between the specimens and resistances. A potential source, such as battery 34, is connected across two opposite points of juncture, and galvanometer 36 is connected across the remaining the remaining two joints of juncture. It is evident that if the bridge is initially balanced, and this balance is disturbed by changing the ratio of resistances of specimens 18 and 20, the galvanometer will deflect in proportion to this change in ratio.

The joints between the lead wires and specimens are preferably soldered, and the soldered joints coated with an electrically-insulating, corrosion-impervious material. The lead wires 12, 14, and 16 may be made with sufficient rigidity to provide mechanical support for the two specimens 18 and 20. Alternatively, the specimens may be supported by another structure, which is in turn supported by base 10. Various specimen-support means are described in the aforenamed ptaents to Edward Schaschl. Base 10 is preferably provided with threads 26 for inserting the probe into a threaded opening in a process vessel. The base is provided with a hexagonal head 28 to accommodate a wrench which may be used to tighten the probe in place.

The test specimen 20 is elongated and of circular cross-section. The compensating element 18 is elongated and of rectangular cross-section. The thickness (smallest dimension) of the compensating specimen is critical, in that it bears a special relationship to the radius of the test specimen. The specimen 18 may have two exposed flat surfaces 40 and 42, as shown, or alternatively may have a single exposed surface such as 40, the other surface 42 being protected by a corrosion-impervious material. In either event, it is critical that the thickness of the specimen 18, divided by the number of exposed surfaces such as surface 40, provide to the radius of the test specimen 20 a ratio in the range of 0.74 to 0.77, and more preferably provide a ratio in the range of 0.75 to 0.76. The width of the specimen 18 must be not less than about 5 times the thickness, and preferably will be about 10 times the thickness. The length of the specimens 18 and 20 is not critical, but it is preferred that the initial ratio of the resistance of specimen 20 to the resistance of specimen 18 be in the range of about 2 to about 10.

Figure 2:
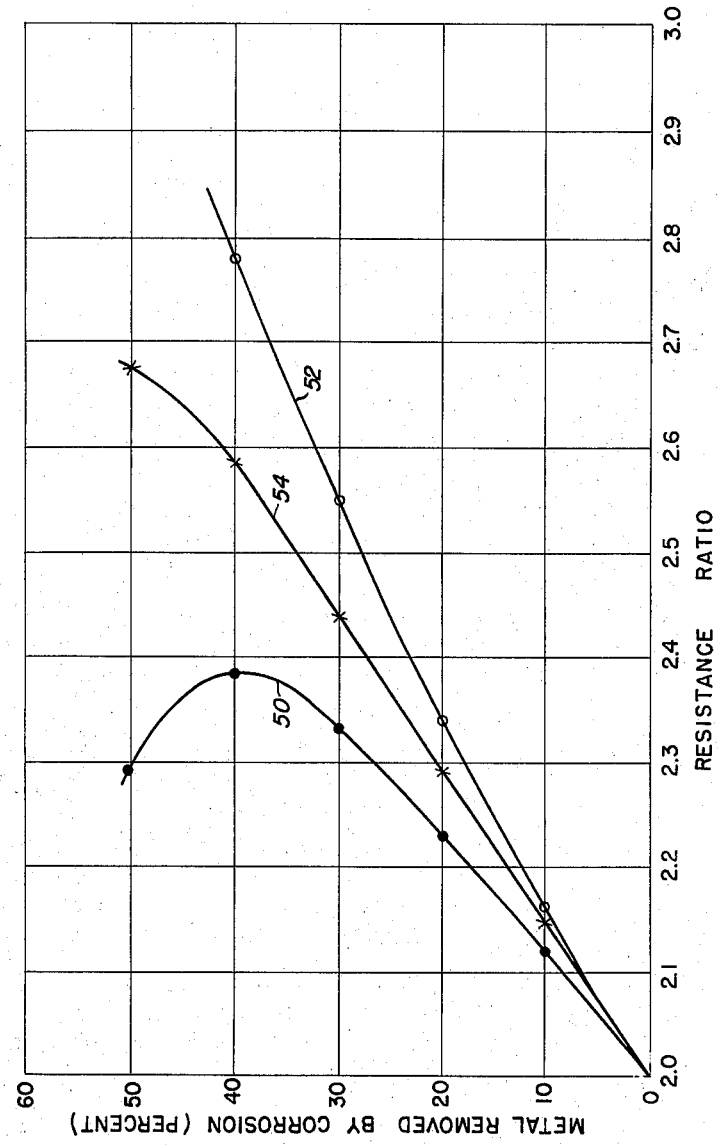
FIGURE 2 is a graph showing the relationship between weight of metal removed by corrosion and the resistance ratio for test probes having specimens of varying critical dimensions.

The criticality of the ratio of thickness per corrodible side of the compensating specimen 18 to the radius of the test specimen 20 is made apparent by consideration of the curves on the graph of FIGURE 2. Curve 54 is plotted for a dimensional ratio of 0.75, in accordance with this invention. Thickness of metal removed by the corrosion process is plotted as an ordinate, and resistance ratio of the two specimens is plotted as the abscissa. In each of the three cases for which curves are shown, the initial ratio of the resistance of the test specimen to that of the compensating specimen was two. As metal was removed from the two specimens by the corrosion process, the resistance ratio of the corrosion probe represented by curve 50 remained linear over only about 20% of metal removal. For this probe, the ratio of thickness of compensating element per side exposed to the radius of the test specimen was 0.70. Curve 52 depicts the corrosion-resistance characteristic of a probe in which the ratio of the thickness per corrodible side of the compensating specimen to the radius of the test specimen was 0.80. It is seen that this probe has a linear corrosion-resistance-ratio response over only about the first 10% of probe life. The curve 54 is representative of the corrosion-resistance ratio relationship for a probe fabricated in accordance with this invention. This curve represents that obtained by a ratio of thickness per corrodible side of the compensating specimen to radius of the test specimen of 0.75. It is seen that this curve is substantially linear up to the point at which 40% of the radius of the test element has been removed by the corrosion process.

The corrosion probe of this invention is particularly adapted for use with a simple measuring circuit of the Wheatstone-bridge type, providing a fixed resistance in one arm and a variable resistance in the adjacent arm. This simple, conventional bridge, when used in conjunction with the probe of this invention, provides linear corrosion-resistance-ratio response, in that each unit of change of resistance of the variable resistance 32 balances the removal by the corrosion process of one unit of metal removed from the test specimen 20, until the diameter of the test specimen has been reduced by 40% of its initial diameter.

As an illustrative example of a corrosion probe fabricated in accordance with this invention the following dimensions are given:

| | |
|---|---|
| Rectangular element | 0.03 inch thick by 0.3 inch wide by 5 inches long. |
| Wire diameter | 0.04 inch diameter by 2.1 inches long. |
| Dimensional ratio | Both sides exposed, 0.75. |
| Ratio of resistances, initial | 3.0. |
| Ratio of resistances, at 40% diameter reduction | 3.45. |
| Linear life of probe | 8,000 micro-inches metal loss. |

The embodiments of the invention in which an exclusive property or privilege is claimed are defined as follows:

1. A corrosion probe comprising a first, bare, elongated specimen of circular cross-section fabricated of a corrodible, electrically conductive metal, a second elongated specimen of rectangular cross-section fabricated of the same metal and having two opposite surfaces, each of greater area than the remaining surfaces, at least one of said opposite surfaces being bare, the thickness of said second specimen, divided by the number of said bare opposite surfaces thereof being such so as to provide to the radius of said first specimen a ratio in the range of 0.74 to 0.77, means for supporting said specimens for exposure to a corrosive environment, and first conductor means electrically connected to one end of each said specimen, and second and third connector means connected to the other ends of said specimens, respectively.

2. The probe in accordance with claim 1 in which the ratio of width to thickness of said second specimen is not less than 5/1.

3. A probe in accordance with claim 2 in which the ratio of the electrical resistance of said first specimen to that of said second specimen is in the range of about 2–10/1.

4. A probe in accordance with claim 3 in which the thickness of said second specimen divided by the number of said bare opposite surfaces thereof, provides to the radius of said first specimen a ratio in the range of 0.75–0.76.

5. A probe in accordance with claim 4 in which the ratio of width to thickness of said second specimen is about 10/1.

6. A corrosion probe comprising a first, bare, elongated specimen of circular cross-section fabricated of a corrodible, electrically conductive metal, a second elongated specimen of rectangular cross-section fabricated of the same metal and having two opposite surfaces, each of greater area than the remaining surfaces, at least one of said opposite surfaces being bare, the thickness of said second specimen, divided by the number of said bare opposite surfaces thereof being such so as to provide to the radius of said first specimen a ratio in the range of 0.74 to 0.77, means for supporting said specimens for exposure to a corrosive environment, and conductor means electrically connecting said specimens as two adjacent arms of a Wheatstone bridge circuit having four arms serially connected in closed circuit to provide four junctures, a resistance and a variable resistance connected as the remaining arms of said bridge circuit, said variable resistance being in the arm adjacent to said first specimen, a potential source connected across two opposite junctures of said bridge, and potential-sensing means connected across the remaining junctures.

7. An apparatus in accordance with claim 6 in which the ratio of width to thickness of said specimen is not less than about 5/1.

8. A probe in accordance with claim 7 in which the ratio of the electrical resistance of said first specimen to that of said second specimen is in the range of 2–10/1.

9. A probe in accordance with claim 8 in which the thickness of the second specimen divided by the number of said bare opposite surfaces thereof, provides to the radius of the first specimen a ratio in the range of 0.75–0.76.

10. A probe in accordance with claim 9 in which the ratio of width to thickness of said second specimen is about 10/1.

References Cited by the Examiner

UNITED STATES PATENTS

| | | | |
|---|---|---|---|
| 2,848,682 | 8/58 | Chittum | 324—65 |
| 2,993,366 | 7/61 | Birkness | 73—86 |

WALTER L. CARLSON, *Primary Examiner.*